United States Statutory Invention Registration [19]

[11] Reg. Number: H690

Martenson [43] Published: Oct. 3, 1989

[54] DEVICE TO ALLOW FOR EXPANSION OF NUCLEAR FUEL ASSEMBLIES

[75] Inventor: Alfred J. Martenson, Richland, Wash.

[73] Assignee: Advanced Nuclear Fuels Corporation, Bellevue, Wash.

[21] Appl. No.: 252,293

[22] Filed: Sep. 30, 1988

[51] Int. Cl.[4] ..... G21C 3/02

[52] U.S. Cl. ..... 376/445; 376/364; 376/285

*Primary Examiner*—Harvey E. Behrend

*Attorney, Agent, or Firm*—Volker R. Ulbrich

[57] ABSTRACT

An upper tie plate assembly for a nuclear reactor includes the usual tie plate having holes to receive the tie rod of the fuel assembly. A lower side member is welded to each side of the tie plate and there is a spring seat at each corner, connected to the lower side members. An upper side member parallels each lower side member at a higher elevation. At an intermediate elevation, there are leaf springs paralleling the side members, with their ends received within spring seats provided at the corners of the plate. Sliders are mounted on the upper side members and engage the midpoints of the upper surfaces of the springs. As the fuel assembly expands, the sliders, which engage an upper core plate of the reactor, deflect the springs from their normal, upperwardly bowed position, through a flattened position, to a downwardly bowed position. The ends of the springs are mounted within the spring seats in such a manner that they are free to accommodate extension of the springs. This avoids undesirable stresses in the springs. This arrangement leaves the central part of the tie plate free of obstructions to the flow of cooling water, and the spacing of the upper and lower side members and the springs leave room for the insertion of grappling members from either the inside or the outside of the tie plate assembly to lift the fuel assembly.

1 Claim, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 2
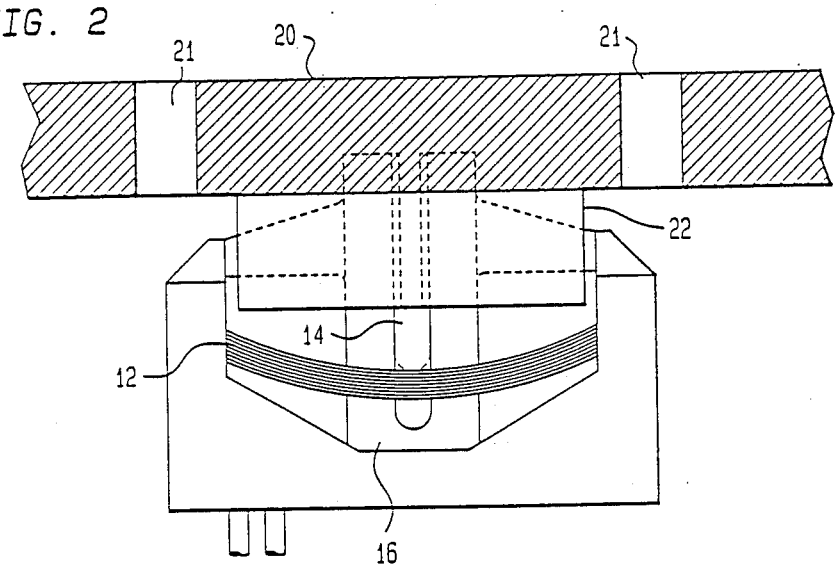
FIG. 3
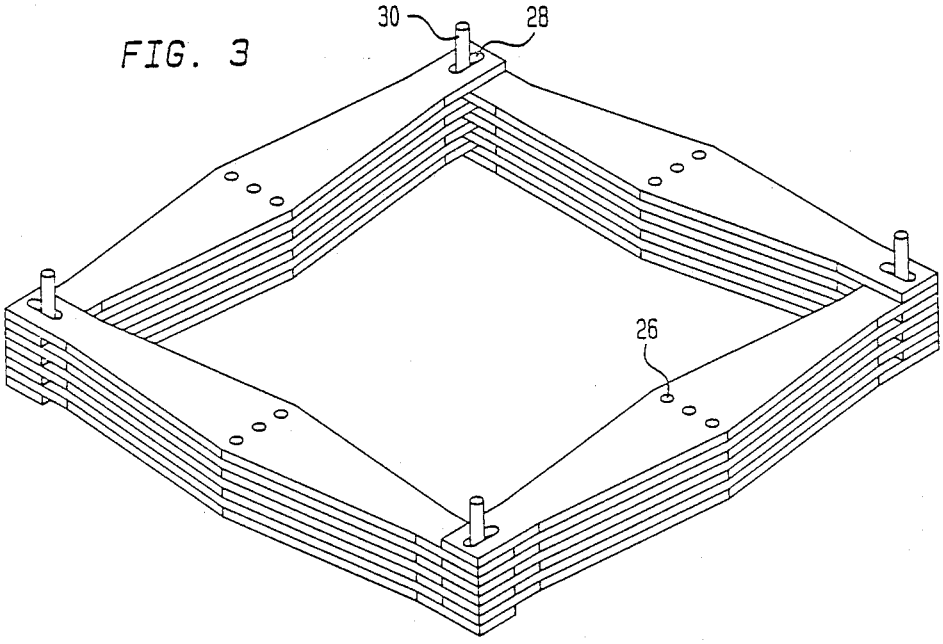
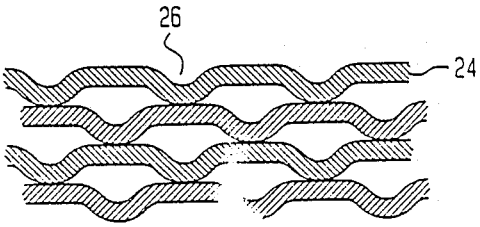
FIG. 3A

UNDEFLECTED

FLATTENED

UNDEFLECTED

FLATTENED

DEVICE TO ALLOW FOR EXPANSION OF NUCLEAR FUEL ASSEMBLIES

In the type of nuclear reactors used for power production purposes in the United States and in most European countries, the fuel is in the form of fuel rods which are grouped into assemblies. These assemblies include upper and lower tie plates between which the rods extend, and spacers, usually in the form of grids, which hold the rods in the proper spaced relationship. The assemblies are mounted in the reactor between upper and lower core plates, which are fixed components of the reactor structure. The upper and lower tie plates are perforated so as to admit cooling water to the rods. The water flows upwardly through the fuel assemblies.

This upward flow of coolant water produces a pressure drop, which would lift the assemblies off their support on the lower core plate, if they were not restrained by the upper core plate. The downward forces from the upper core plate must be transmitted through a flexible element to accommodate differential thermal expansion of the fuel rods and other components of the assemblies relative to the reactor core barrel. It is also necessary to accommodate axial growth of the fuel as it is burned in the reactor. This has been done in existing fuel assemblies with coil springs or with cantilevered leaf springs. U.S. Pat. No. 4,072,562 describes another arrangement using combined cantilever/torsion bar springs. Coil springs have the disadvantage that they must be positioned in the high velocity full stream of the coolant water, thereby causing additional pressure drop, providing the possibility for flow-induced vibrations, and interfering with the accessibility to the fuel rods. Cantilevered springs avoid these problems, but, because of their position on the periphery of the tie plate, they may interfere with some fuel assembly grappling mechanisms. The combined cantilever/torsion bar spring avoids all these problems, but at the expense of added complication.

SUMMARY OF THE INVENTION

This invention relates to a fuel assembly having an upper tie plate assembly, characterized by a four-sided arrangement of multiple leaf springs. An upper member of the tie plate assembly includes four sliders which, at their upper ends, contact the reactor upper core plates when the fuel assembly is in position in the reactor core so as to apply a hold-down force on the assembly. The lower ends of the sliders contact the middles of the four multiple leaf springs. As originally installed, the springs are curved upwardly toward their midpoints. As they are compressed toward and past the flattened position each of the four springs first elongates, so that the spring shape tends to become a larger square. As it is depressed past the flattened position, it again decreases in size. If the springs were rigidly attached at the corners of the square, the centers of the springs where they are contacted by the sliders would necessarily move outward and then inward to conform to the varying size of the square. This would dictate either slippage under the slider or distortion of the leaves in the horizontal direction or both. Both of these reactions are undesirable since they produce added stresses in the springs and less control of the springs' positions in the tie plate.

In order to overcome this difficulty the springs are loosely secured at the corners so that the leaves may slide over one another. According to one embodiment of my invention, the springs are loosely pinned at their ends, the pins being surrounded by apertures or slots which are sufficiently large to permit the sliding of the leaves just mentioned. Each leaf then expands along its length as a spring is flattened and is not allowed to move sidewise, thus assuring no change in size of the square and, therefore, no sidewise friction forces under the slider. Since each spring is slidable at each end, the movement of their midpoints is accurately vertical.

The pins have two functions. First, they simplify assembly, since the spring can be assembled in a separate fixture and later added as a unit to the tie plate. Their second function is to trap leaf spring segments in place if the leaves were broken. It is not necessary to peen the end of the pin as would be done with a rivet, since a loose connection is desired and the upper end fits into a hole in the upper section of the tie plate assembly In this way the pin is trapped in place and its segments cannot escape if the spring were broken.

According to a second embodiment, the pins are omitted and the ends of the leaves pass through the walls of a hollow square receptacle which permits movements of the ends and traps leaves in place.

In order to minimize corrosion, the leaves are dimpled at their mid sections so as to keep them spaced. Since they are stacked alternately about the square this means that they are spaced throughout their length, except where they are pinned or otherwise secured together

BRIEF DESCRIPTION OF THE DRAWING

In the drawing, FIG. 2 is an elevation and partial section showing the relationship of the upper tie plate and springs to the upper core plate. FIG. 3 is a perspective view showing the spring assembly. FIG. 3*a* is a partial section of the middle portion of a spring.

DETAILED DESCRIPTION

Figure 1:
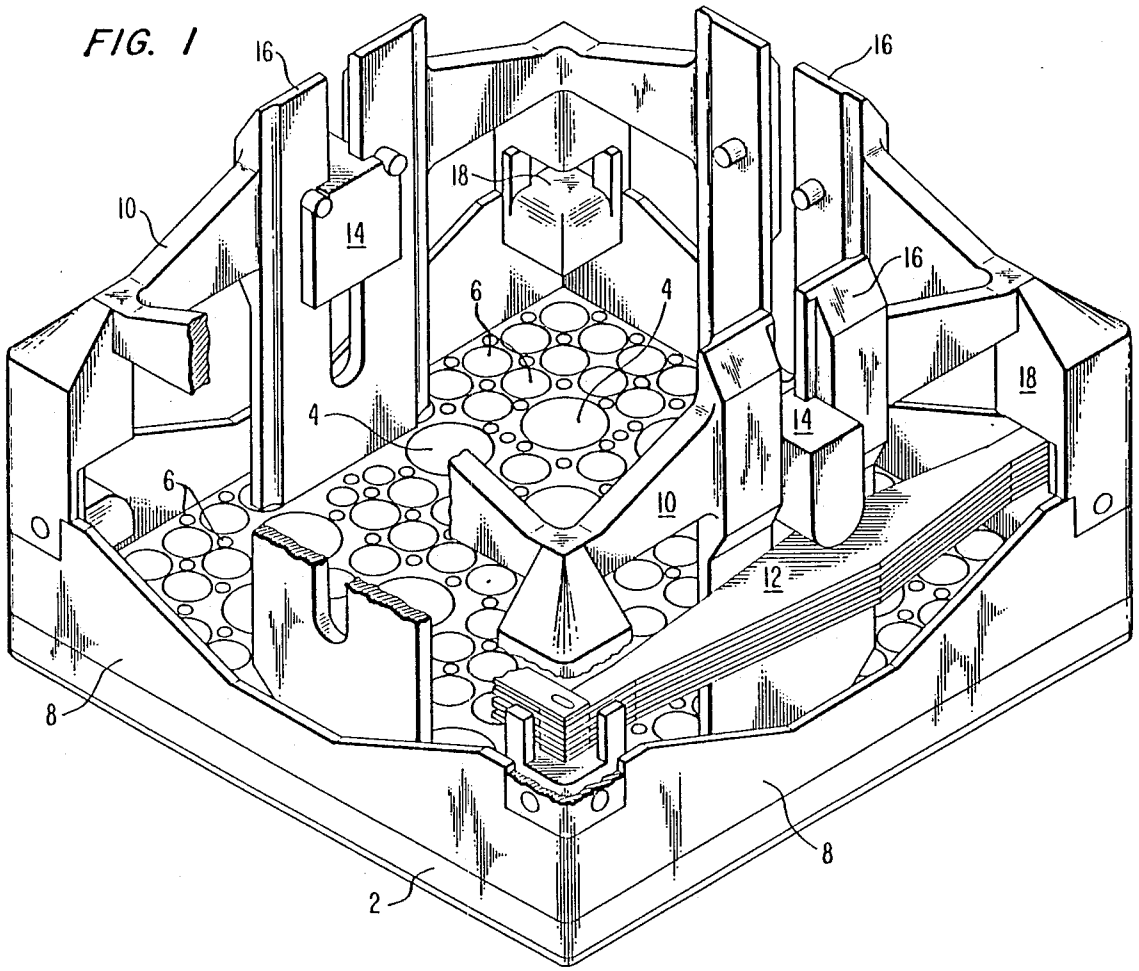
FIG. 1 is a perspective view of the upper tie plate assembly with parts omitted and others broken away to better show the structure.

This invention deals with an upper tie plate assembly intended for use with a reactor having an upper grid plate provided with blocks or "pads" such as are shown in, for example, U.S. Pat. Nos. 4,072,564 or 4,155,808. Both of these patents are incorporated herein by reference. Referring to FIG. 1 of the drawing, the tie plate assembly includes a tie plate 2 provided with holes 4 for the reception of the upper ends of the tie rods and openings 6 for the passage of cooling water. Preferably the tie rods are secured in holes 4 by quick detachable means, such as for example, those shown in U.S. Pat. No. 4,219,386 to Jon L. Osborne and Barney S. Flora. On each of the four sides of plate 2, there are lower side members 8 and upper side members 120. Springs 12 are at a level intermediate to the upper and lower side members. A slider 14 rests on the midpoint of each spring 12 and is guided by a guide member 16 which is secured to or integral with an upper side member 10. The ends of springs 12 are received in spring seats 18, one of which is positioned at each corner of the plate 2 and is mounted on two intersecting lower side plates 8. These spring seats will be described later. Each is welded, or otherwise strongly secured to upper side members 10 and lower side members 8, the latter being welded to tie plate 2.

FIG. 2 shows the relationship of the upper tie plate assembly to the reactor structure. At the upper end of the reactor core barrel, is a horizontal core plate 20 which is provided with openings 21 for the passage of cooling water. A plurality of core plate blocks or "pads" 22 are secured to the bottom of the core plate 20. There are four of these blocks for each fuel assembly and each engages one of the sliders 14. The pressure of the sliders, on the springs 12, serves to hold down the fuel assemblies against the force of the upwardly flowing cooling water and resilience of the springs permits the necessary expansion which results from thermal expansion of the assembly structure as well as from neutron irradiation growth.

FIGS. 3 and 3*a* show the structure of the springs 12. As is shown best in FIG. 3*a*, each spring is composed of a plurality of leaves 24. At the middle of each spring there is a row of dimples 26 which are staggered so as to space the leaves 24 apart. It will be noted that at the corners the leaves of the successive springs are interleaved in an "over-under" arrangement. The leaves are, therefore, spaced apart throughout their length. This serves to minimize corrosion. As is shown in FIG. 3, each of the leaves is provided at each end with an elongated slot 28 which receives a pin 30.

Figure 4:
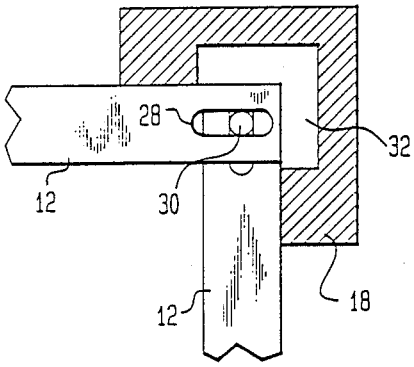
FIGS. 4 and 4*a* are detailed views of corners of a spring assembly of the type involving the pins.
Figure 4A:
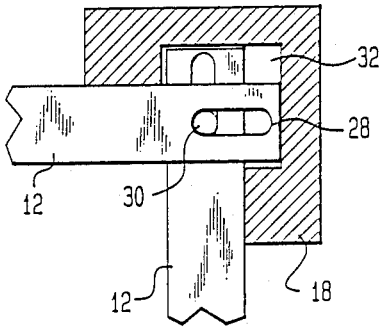

FIGS. 4 and 4*a* show the spring seats 18 and the ends of the springs 12 in the form illustrated in FIG. 3. The spring seat 18 is a box-like structure having a central chamber 32. The chamber 32 is partially surrounded by the walls of spring seat 18. There are two complete walls and two partial walls, the latter being so formed as to leave one corner of the chamber 32 open for the reception of the springs 12. The pin 30 is seated at its lower end in plate 2. FIG. 4 shows the relationships when the springs 12 are either undeflected (i.e. arched upardly) or fully deflected (i.e. bowed downwardly). In these positions the springs span a minimum chord and the pin 30 is near the end of each of the leaves, as shown by its relationship to the slots 28. FIG. 4*a* shows the relationship when the spring is flattened. In that instance, the pin 30 is farthest from the ends of the spring leaves as again shown by the relationship of pin 30 to slots 28. When the springs 12 are depressed the walls of the spring seats 18 act as stops to prevent sideward motion of the spring leaves. The latter slide back and forth over the pins 30. Since both ends of each leaf slide, the midpoint, which contacts slider 14, does not move.

In this arrangement the assembly, as shown in FIG. 3, can be formed in a separate fixture and set onto the plate 2. The spring seats 18 can then be set over it and welded or otherwise secured to plate 2 and/or lower side members 8.

In the unlikely event of a spring leaf breaking, it is held in position by the pins 30 at each end.

Figure 5:
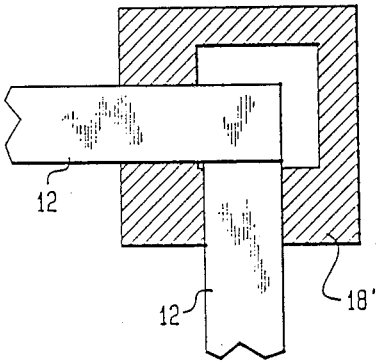
FIGS. 5 and 5*a* are detail views showing the corner of the spring assembly of the type in which the pins are omitted.
Figure 5A:
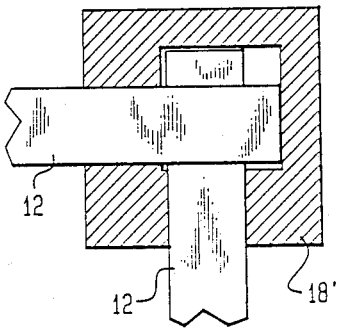

FIGS. 5 and 5*a* illustrate a different arrangement of the spring ends in a modified form of spring seat 18'. In this case the slots 28 and pins 30 are omitted and the spring seat is provided with four sides, two of which are slotted to receive the springs 12. The ends of the spring leaves slide over each other in the same manner as in FIG. 4. When the position of the spring changes it is held in place by the walls of the spring seat.

It will be seen from FIG. 1 that almost the entire surface of the tie plate 2 through which the cooling water flows free of obstructions. Moreover, since the lower side members 8, the springs 12 and the upper side members 10 are on different levels, and since the side members, the spring seats, and the tie plate 2 are welded or otherwise strongly secured together, grapple hooks can be inserted under members 10 from either the outside or the inside when it is desired to lift the fuel assembly.

I claim as my invention:

1. A fuel assembly for a nuclear reactor comprising:

a bundle of fuel rods;

an upper tie plate assembly arranged at the upper end of said bundle, said tie plate assembly comprising:

an upper tie plate having holes to receive tie rods forming part of said bundle and openings for the flow therethrough of cooling water;

a plurality of lower side members mounted on and bounding said tie plate;

a plurality of spring seats mounted on said lower side members, one spring seat being located at each corner of said tie plate;

a plurality of upper side members mounted on said spring seats, one upper side member being mounted at each side of said tie plate and spaced above said lower side members;

a plurality of leaf springs mounted above said lower side members and below said upper side members, said leaf springs having their ends located within said spring seats and being formed of a plurality of superposed leaves, said springs being bowed upwardly at their midpoints when in an unstressed condition;

a plurality of sliders supported by said upper side members, one of said sliders engaging the upper surface of each of said springs adjacent its midpoint, and each of said sliders being adapted to engage a fixed portion of said reactor, whereby on expansion of said assembly, said sliders bend springs through positions in which they are substantially flat to positions in which they are downwardly bowed;

said leaf springs being mounted within said spring seats in such a manner that the ends of said springs are free to accommodate extension of said springs as the midpoints of said springs are depressed by said sliders.

* * * * *